United States Patent [19]

Postavnichev et al.

[11] 4,096,069
[45] Jun. 20, 1978

[54] FILTER FOR POLYMER MELTS AND SOLUTIONS

[76] Inventors: Vladimir Konstantinovich Postavnichev, ulitsa Chernyakhovskogo, 12, kv. 85; Vladimir Ivanovich Klochkov, ulitsa Narodnogo Opolchenia, 5, kv. 57; Semen Ilich Gdalin, Oktyabrskaya ulitsa, 19, kv. 79; Vyacheslav Vasilievich Sharonov, Sumskaya ulitsa, 12/17, kv. 209, all of Moscow, U.S.S.R.

[21] Appl. No.: 764,958

[22] Filed: Feb. 2, 1977

[51] Int. Cl.[2] .............................................. B01D 25/02
[52] U.S. Cl. .................................... 210/342; 210/411;
210/420; 210/446; 210/456; 425/199
[58] Field of Search ............... 210/407, 411, 420, 446,
210/451, 453, 455, 483, 488, 456, 342; 425/197,
199; 264/210 R, 210 F

[56] References Cited

U.S. PATENT DOCUMENTS

| 2,905,326 | 9/1959 | Judson et al. | 210/446 X |
| 3,221,882 | 12/1965 | Frantz | 210/488 X |
| 3,397,794 | 8/1968 | Toth et al. | 210/446 X |
| 3,965,010 | 6/1976 | Phillips, Jr. et al. | 425/199 X |

FOREIGN PATENT DOCUMENTS 534,671  3/1922  France ................................. 210/420

Primary Examiner—William A. Cuchlinski, Jr.
Attorney, Agent, or Firm—Robert E. Burns; Emmanuel J. Lobato; Bruce L. Adams

[57] ABSTRACT

A filter for polymer melts and solutions comprises a casing having an inlet opening and an outlet opening. The casing accommodates a hollow mandrel supporting filter elements which are axially unmovable due to the provision of clamping flanges. Each element consists of a spacer plate located between filtering baffles, a sleeve having through radial passages communicating the inner space of the filter element with the inner space of the mandrel, the sleeve being mounted between the filtering baffles on the periphery of the mandrel, and a seal located between the filtering baffles on the periphery of the spacer plate. In addition, the casing accommodates auxiliary seals provided between the filter elements on the periphery of the mandrel and a spacer device arranged between the filter elements. The spacer device comprises auxiliary spacer plates each corresponding to the filtering surface of the filtering baffle. The filter is also provided with a washing device.

6 Claims, 5 Drawing Figures

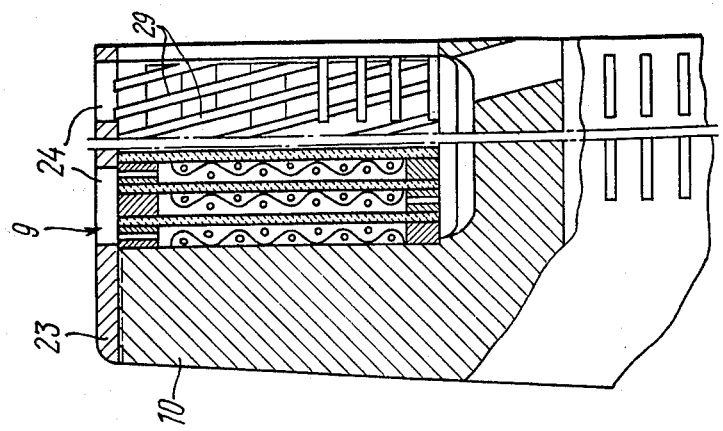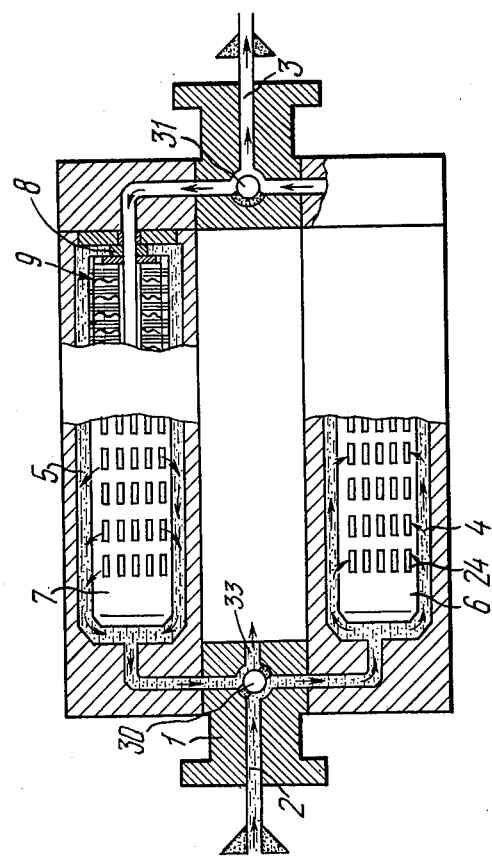

FILTER FOR POLYMER MELTS AND SOLUTIONS

BACKGROUND OF THE INVENTION

The invention relates to the manufacture of polymeric products, and more particularly to filters for polymer melts and solutions.

The invention may be most advantageously used for cleaning polymer melts obtained from extruders.

For the manufacture of various products of polymeric materials using extruders, such as substratum for photographic materials, insulating films for electric insulation purposes and capacitors, transparent sheets and yarn, clean resin is required. During preparation of polymer and its subsequent pelletizing as well as during packaging and shipment thereof to processing plants, it is impossible to avoid contamination with solid inclusions of the material which should therefore, be filtered. Filters are specially added to some of the polymers with a purpose to improve their properties and quality of finished products. Most of the fillers are finely ground substances, such as titanium dioxide added to polyethylenetherephthalate.

Despite appropriate classification of the filler powder, particles of a size exceeding admissible limit enter the polymer.

Films and yarn made of polymeric materials filtered during the manufacture are characterized by the lower thickness limit of 1 to 30$\mu$. Filtered particle size should not exceed the thickness of finished product and in majority of applications their size should be even smaller than that of the product thickness.

Coarse inclusions in the films and yarn result in breakage during continuous manufacture of products, increased quantity of discarded products and higher manufacturing cost.

In addition, films and yarn with coarse inclusions exhibit lower technical parameters as regards electric strength, transparence and other properties.

Filtering of polymer melts and solutions substantially differs from filtering of other contaminated liquids. Processing of melts features high viscosity (500 – 50000 Pu), relatively high filtering temperature (up to 400° C), low concentration of solids, low thermal stability of majority of polymers in molten state. Throughput capacity of extruder plants equipped with filters reaches from 500 to 1000 kg/h, and the fineness of cleaning should be up to 1 – 30$\mu$, as mentioned above.

Combination of properties of processed material and requirements imposed on finished products calls for application of high pressure during filtering (up to 200-300 kp/cm$^2$) It is to be noted that duration of continuous operation is 15-30 days, the period required to ensure stability of thermal performance of processing plants, reduce inoperative time of equipment and lower polymer losses associated with starting periods during which stable performance parameters are achieved. However, even at the processing temperature, continuous thermal exposure of the melt for 5-10 hours results in its destruction and impaired properties of manufactured products.

Therefore, there should be no dead zones in filters for polymer melts, and filter construction should provide for directional flow of melt.

Widely known filters and filtering plants for separation of suspensions and purification of oils are unsuitable for filtering polymer melts because of different pressure and temperature parameters involved and dead zone formation. Special filters are employed for polymer melts. Continuous filters are most promising among them.

Filters for polymer melts are divided into three fundamentally different groups:
filters having replaceable filter elements;
filters with intermittent washing of filter elements;
filters with continuous washing of filter elements.

It is common knowledge that the filters of the first group having replaceable filter elements comprise a casing with heaters, an inlet opening and an outlet opening, a movable partition in the form of a cylinder or plate, two replaceable filter elements located therein which are made in the form of discs, and a pneumatic or hydraulic drive system for displacement of the partition. The partition is arranged at right angle to the melt flow. With one of the filter elements being clogged, the partition is displaced and the other filter element is put in operation. The used filter element is removed to be replaced by a new one.

In such filters, small filtering surface results in cyclic changes in the melt pressure upstream the filter, i.e., from minimum value upon installation of a new filter element up to maximum value when the filter element is regarded as completely clogged. Such pressure changes result in increased difference in thickness of manufactured products. Filtering surface in such filters is within the limits of the extruder screw diameter, hence frequent replacements of filter elements. In addition, known filters are difficult to operate because of the necessity to replace filter elements at the polymer melting point (above 200° C); it is likewise difficult to avoid melt leakages along the travelling area of the movable partition wherethrough polymer may enter heaters to cause their failure and contamination of manufacturing environment.

Filters of the third group with continuous washing of filter elements are based on the principle of rotation of the filtering surface relative to the inlet chamber and washing device.

A known filter possesses a casing formed with an inlet opening and an outlet opening, and accommodating two rotatable filtering discs, the axis of each disc being at right angle to the flow path. The discs are rotated by an electric motor. Each filtering disc adjoins to a fixed perforated plate secured to the casing. The casing is provided with a valve communicating with a washing liquid draining line. A melt fed through the inlet opening is passed to a part of the surface of the rotary filtering discs. A major part of the filtrate leaves through the filter outlet opening, and a part of the melt passes through the contaminated surface of the rotary filtering discs. The flow rate of the melt for washing the filter elements is controlled by means of the valve.

The use of the known filter for fine cleaning to be carried out with high throughput capacity of the polymer melt, such as polyethyleneterephthalate, is impossible due to the need in large filtering surface of the filtering discs.

It is known that with a reduction of pore size while retaining high throughput capacity, the pressure of melt upstream the filter increases, and larger filtering surface is required to lower the pressure. The provision of large rotary filtering surface is, however, hampered by great technical difficulties associated with sealing of the joint between the rotary filtering surface and fixed plate, and results also in rapid wear of the filtering surface, thus adversely affecting the quality of the filtrate.

The use of the valve for regular washing of the filter results in the formation of dead zones in the filter, hence in thermal destruction of polymer melt, thereby impairing the quality of the manufactured products.

In addition, the use of the valve results in cyclic pressure increases, hence in a greater difference in thickness of manufactured products.

The problem of filtering highly viscous polymer melts and solutions at high throughput capacity and the fineness of purification is most successfully solved by application of the filters of the second type with regular washing of the filter elements.

One of the main problems in filtering at high throughput capacity during continuous operation (up to 15–30 days) is the provision of a cartridge filter element having a large filtering surface. A developed filtering surface is obtained by providing undulations axially of or at right angle to the axis of the cartridge. Though both systems are acceptable and find a wide application in a number of filter types, most promising and perfect is the cartridge with undulation at right angle to the cartridge axis. Such a cartridge is normally composed of lenticular filter elements.

Lenticular filter elements have filtering surfaces on either side.

A screen plate having a through central hole coaxial with the through hole of the filter element is accommodated in the inner space of the filter element. This hole receives a sleeve having through radial passages communicating the inner space of the filter element with the inner space of the sleeve which is connected to the outlet opening of the filter.

The filtering surface defined by cermet discs is welded along the periphery. A plurality of such lenticular elements are supported by a hollow mandrel to form a cartridge having a developed filtering surface. They are axially fixed by means of clamping flanges.

In order to prevent contaminated solution from leaking through the filter elements, there is provided a seal located on the sleeve of the filter element.

Such cartridges having developed surface are successfully used in filters for a polymer melt, operating at high throughput capacity for sufficiently long time.

Where troubles arise in the manufacturing process in the production of films or yarn, the filter elements should be washed.

In addition, during the starting period of operation, after replacement of the filter and upon a new starting cycle, washing of the filter elements is also required.

Contaminations of filtering surfaces result from overheating and destruction of polymer due to the long-term residence of melt in the filter at a high temperature.

The use of such filters in extruders for manufacturing lines in the production of films and yarn is, however, complicated due to the fact that there is no provision for washing the filter with reversed melt flow directly in the filter. This is due to the fact that the weld zone fails upon feeding melt to the inner space of the filter elements.

Development of filters with a large filtering surface with a possibility of washing directly in the filter becomes especially important for fine and superfine filtering where the quantity of entrapped particles increases, and clogging of pores is substantially accelerated, while the filtering time is reduced. The construction of one of the known filters almost solves the problem of washing filtering baffles. This known filter comprises a casing formed with an inlet opening and an outlet opening and accommodating a hollow mandrel. The mandrel has through radial passages. Filter elements located on the mandrel are axially fixed.

The filter element has two filtering baffles. A metal ring is located between the filtering baffles on the periphery thereof. The ring is welded to the baffles so as to define a space accommodating spacer plates. The spacer plates have perforations and a central hole coaxial with the through holes of the filtering baffles forming the filter element.

The spacer plates adjoin the filtering baffles. A sleeve having through radial passages provides communication between the inner space of the filter element with the inner space of the sleeve which is connected to the outlet opening of the filter and extends through the central holes of the baffles and plates.

The filtering baffles are welded to the sleeves, and the sleeves are welded to the mandrel in such a manner that their radial passages are in register with those of the mandrel.

A plurality of such elements fixed to the hollow mandrel form a cartridge having developed filtering surface.

Auxiliary perforated plates adjoining the filter elements are mounted between the filter elements. Cartridges having such filter elements may be used for filtering polymer melts and solutions at high throughput capacity and during continuous operation.

Contaminated polymer is admitted under pressure to the filter casing through the inlet opening. After the polymer fills the inner space of the filter, the melt or solution is squeezed through the filtering baffles of the filter elements fixed to the hollow mandrel. Filtrate flowing along the spacer plates leaves the inner space of the filtering elements through the radial passages of the sleeves to pass through the hollow mandrel and leave through the outlet opening of the filter.

This known construction of the filter cannot provide for reliable contact of the spacer plates with the filtering baffles. This is explained by the fact that there are inevitable manufacturing thickness tolerances in making filtering baffles and spacer plates. The thickness not only differs from plate to plate, but each spacer plate or baffle has different thickness at various points of its surface.

Dimensional deviations in thickness result in the absence of intimate contact between the filter elements and spacer plates after assembly so that the filtering baffles are axially displaceable to result in weaker interconnection of the filter elements along the periphery. This results in failure of filter elements during washing of the cartridge due to breakages in the weld zone.

In addition, welding of the ring along the periphery of the filtering baffles also results in weakening of the weld zone due to appearance of internal stresses thus also lowering the strength of the filter elements. Therefore, pressure difference across the filtering baffles cannot be increased, filter recovery is incomplete, and service life of the filter is short.

During filtering, the filtering baffles are clogged in time to such an extent that their further operation becomes inexpedient. Due to the solid construction of the filter, the entire cartridge is to be replaced, while only filtering baffles are "worn" so that the filter is economically inadvantageous.

Attempts to provide an economically advantageous filter resulted in the development of a filter having a demountable cartridge construction. The filter comprises a casing formed with an inlet opening and an outlet opening, accommodating a filtering assembly. The filtering assembly comprises two flanges, filter elements located between the flanges, each element consisting of two filtering baffles having through central holes. A spacer plate having a central hole coaxial with the holes of the filtering baffles is located between the baffles, the spacer plate also serving for sealing the filtering baffles along the periphery. The filtering element also comprises a sleeve having through radial passages, which is located on the periphery of the central hole of the filtering baffle. The surface of the spacer plate adjacent to the filtering baffle has a plurality of passages communicating with the through central hole of the baffle. Spacer sleeves are mounted between the filter elements on the periphery thereof, which have through radial passages, and a sealing ring is provided on the periphery of the through hole of the filtering baffles. The filter elements are axially kept in position by means of flanges and their radial displacement is limited by shoulders of the spacer sleeves.

The filter elements, spacer sleeves and sealing rings are axially pressed together between flanges which are tightened by means of a stud and a nut. One end of the stud is screwed in an auxiliary flange adjacent the cartridge flange. The auxiliary flange has through passages communicating with the radial passages of the sleeves of the filter element and with the outlet opening of the filter.

This filtering assembly may be used for filtering polymer melts and solutions at high throughput capacity during continuous operation. Contaminated liquid is admitted under pressure to the filter casing through the inlet opening. After the contaminated liquid has filled up the inner space of the casing, it is fed through the radial passages of the spacer sleeves to the surface of the filter elements. Filtrate separated at the filtering baffles flows through the passages of the spacer plates and through radial passages of the filter element and thence flows via the openings of the auxiliary flange of the cartridge to the outlet opening of the filter.

Such a filter for filtering polymer melts and solutions has a short service life because it does not enable washing of the filtering assembly directly in the filter for the filtering baffles fail due to their deformation upon feeding viscous liquid to the inner space of the filter elements.

The known construction of the filter cannot provide for reliable filtering of polymer melts and solutions with fine and superfine purification due to the lack of intimate contact, that is due to the formation of an uncontrollable gap between each spacer plate and filtering baffle after the assembly of the filtering group because of the difference in thickness of these components. This factor results, after all, in penetration of contaminants to filtrate.

In addition, this construction results in appearance of dead zones, e.g. between the shoulders of the spacer sleeves and in other places.

SUMMARY OF THE INVENTION

It is an object of the invention to prolong the service life of a filter according to the invention to be used for fine and superfine cleaning of polymer melts and solutions under high pressure and at an elevated temperature.

Another object of the invention is to improve reliability of filtering and provide reliable conditions for washing of filtering baffles.

Still another object of the invention is to improve the quality of filtrate.

With these and other objects in view, the invention consists in a filter for polymer melts and solutions comprising a casing having an inlet opening and an outlet opening and accommodating a hollow mandrel supporting filter elements which are axially fixed by means of clamping flanges, each element consisting of a spacer plate is located between filtering baffles. A sleeve having through radial passages provides communication between the inner space of the filter element with the inner space of the mandrel. The sleeve is mounted between the filtering baffles on the periphery of the mandrel, and a seal is located between the filtering baffles on the periphery of the spacer plate. Auxiliary seals are provided between the filter elements, and a spacer device is arranged between the filter elements, according to the invention. The filter is provided with a washing device, and the spacer device comprises auxiliary spacer plates each corresponding to the filtering surface of the filtering baffle.

The service life of the filter is prolonged due to washing of the filtering elements directly in the filter. The filter elements are in intimate contact with the spacer plates over the entire filtering surface.

Intimate contact is ensured due to the fact that the spacer plates located between the filter elements are not rigidly connected to the seal mounted on the periphery of the mandrel or around the through hole of the filtering baffles.

The spacer plates mounted in such a manner make the filter construction less sensitive to differences in thickness of the plates, baffles and seals, thereby improving the strength of the filter elements during washing, which results in higher admissible pressure difference at the filter elements, and more complete recovery of the filtering baffles, hence in prolonged service life of the filter.

This filter construction considerably reduces the manufacturing cost of products.

The device for washing the filter preferably comprises at least two end spacer plates, each located between the clamping flange and the filter element, and a device for tightening the seals which are located between the filtering baffles on the periphery of the spacer plates. The device is axially movable on at least one of the clamping flanges.

The filter of such a construction has a prolonged service life in fine and superfine cleaning of polymer melts and solutions.

The provision of the end spacer plates between the clamping flanges and the filter elements, as well as the provision of the axially movable device for tightening the seals, which are located between the filtering baffles on the periphery of the spacer plates, enable more complete recovery of the filtering baffles with reversed flow of polymer melt or solution directly in the filter under high pressure. This provides, after all, for obtaining more filtrate with the same area of filtering surface.

The device for tightening seals may comprise a threaded sleeve mounted on one of the mandrel flanges.

With this arrangement a cartridge of filter elements may be reliably compressed on the periphery of the filter elements. This device compensates for the manufacturing tolerances of filtering baffles, sealing rings and spacer plates as regards their difference in thickness both for different pieces and within each piece, such tolerances being inevitable in the manufacturing process. This device permits obtaining, more complete recovery of filter elements, prolonging the service life of the filter, filtrate of better quality due to elimination of eventual gaps and apertures.

The invention may be most advantageously used with the provision of an auxiliary sleeve located on the clamping flanges on the periphery of the filter elements, auxiliary spacer plates and two end spacer plates to prevent radial displacement of the filter elements, auxiliary spacer plate and two end spacer plates.

Prevention of radial displacement of the filter elements and spacer plates is especially important for reliable filtering and washing.

Displacement of the filtering baffles, and especially of the seals of filter element, along with the spacer plates, may result in unreliable construction due to the formation of gaps between mating surfaces.

The displacement particularly affects washing conditions of filter elements where melt or solution pressure is applied from within the filter element, and the peripheral part of the filter elements undergoes tensioning. It is noted that the strength of the filter element under tension is lower than the compression strength during filtering.

The auxiliary sleeve mounted on the flanges on the periphery of the filter elements and spacer plates prevents these components from radially displacing and makes the construction more reliable in filtering and washing.

The auxiliary sleeve is preferably made perforated, and the inner surface of the bushing is provided with multiple helical grooves. This construction of the sleeve, in addition to improvement of the cartridge strength during washing, provides for lowering the resistance offered to the melt flow during filtering and washing, so as to conduct these processes with the smallest size of dead zones at the points of contact of the filter elements, spacer plates and inner surface of the auxiliary sleeve.

The above-described construction enables the production of filtrate with lower contamination due to the polymer destruction and provides for reduced clogging of filtering baffles.

BRIEF DESCRIPTION OF THE DRAWINGS

The invention will now be described with reference to a specific embodiment thereof, taken in conjunction with the accompanying drawings. In the drawings:

FIG. 1 is a diagrammatic view of a filter for polymer melts and solutions according to the invention partially in section;

FIG. 3 is a fragmentary section view of an auxiliary sleeve according to the invention;

DESCRIPTION OF THE PREFERRED EMBODIMENT

Figure 2:
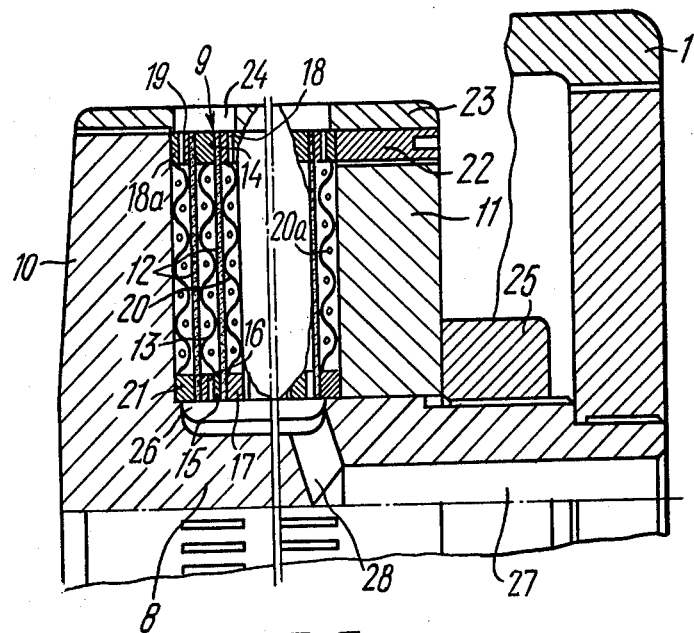
FIG. 2 is an enlarged longitudinal axial section view of the filter.

Referring now to the drawings, there is illustrated therein a filter which comprises a casing 1 (FIG. 1) having an inlet opening 2 and an outlet opening 3 and inner spaces 4 and 5 accommodating filter cartridges 6 and 7, respectively. Each cartridge 6 or 7 consists of a hollow mandrel 8 supporting filter elements 9. A fixed flange 10 (FIG. 2) and a movable flange 11 are mounted on the hollow mandrel 8, and the filter elements 9 are located between the flanges. Each filter element 9 comprises two filtering baffles 12, a spacer plate 13, a seal 14 mounted on the periphery of the spacer plate 13, and a sleeve 15 with through radial passages 16 which provides communication for the inner space of the filter element 9 with the inner space of the mandrel 8.

The sleeve 15 is mounted on the periphery of the mandrel 8. The spacer plate 13 is made of a screen. Additional seals 17 are provided between the filter elements 9 on the periphery of the hollow mandrel 8. In addition, a sleeve 18 having through radial passages 19 which provides communication between the inner space of the filter element 9 with the inlet opening 2 and an auxiliary spacer plate 20, corresponding to the surface of the filtering baffle 12, are mounted between the filter elements 9. An auxiliary seal 21, and an end spacer plate 20a are mounted between the flange 10 and the end filter element 9. A spacer sleeve 18a is located on the periphery of the spacer plate 20a. A device for tightening the seals 14 located on the movable flange 11 comprises a threaded sleeve 22. In addition, this sleeve presses the spacer sleeves 18 and 18a against the filtering baffles 12 and flanges 10 and 11. The filter is provided with an auxiliary sleeve 23 mounted on the flanges 10, 11, on the periphery of the filter elements 9, auxiliary spacer plates 20 and two end spacer plates 20a, and on the periphery of the spacer sleeves 18a. The sleeve 23 prevents radial displacing of the filter elements, and two auxiliary end spacer plates and spacer sleeves; in addition, this sleeve is made perforated with through radial passages 24. The flanges 10 and 11 are pressed together by means of a nut 25 mounted on the mandrel 8. The mandrel 8 is formed with grooves 26 communicating with the radial passages 16 of the sleeves 15 and with the inner space 27 of the mandrel 8 via a through hole 28. The sleeve 23 is internally provided with multiple helical grooves 29 (FIG. 3) for eliminating dead zones and lowering hydraulic resistance. The grooves 29 communicate with the through radial passages 24.

The filter casing 1 has a tap 30 (FIG. 1) providing communication with the inlet opening 2 concurrently and separately with the inner spaces 4 and 5, and a tap 31 provides communication of the inner space 27 (FIG. 2) of the mandrel 8 with the outlet 3 of the filter (FIG. 1).

Figure 4:
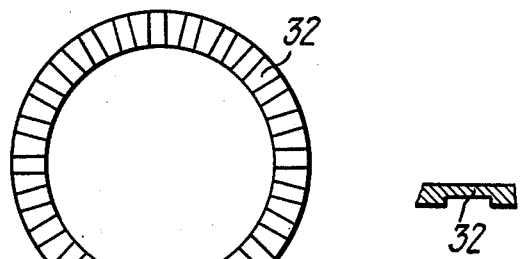
FIG. 4 is an end view of a a spacer sleeve.
Figure 5:
FIG. 5 is a cross-section view taken along section line V—V.

To simplify the construction of the filter cartridge, the spacer sleeves 15, 18 and 18a (FIG. 2) have radial grooves 32 (FIG. 4, 5) providing communication of the periphery of each sleeve with the inner space thereof.

Along with the production of filtrate in the filter according to the invention, a part of the filtrate is used for washing of contaminated cartridge elements.

The filter for polymer melts and solutions functions in the following manner in the operating mode of filtering, provided with one cartridge 6 with concurrent washing of the filter elements of the other cartridge 7.

Contaminated polymer melt or solution is fed under pressure to the inlet opening 2 of the filter. By manipulating the tap 30, the melt is fed to the inner space 4 of the filter cartridge 6. Then the melt flows through the passages 24 (FIG. 2) of the auxiliary sleeve 23 and radial passages 19 of the spacer sleeves 18 moving along the surface of the spacer plates 20 on the surface of the filtering baffles 12. Filtrate separated on the surface of the filtering baffles 12 flows along the surface of the spacer plates 13 of the filter elements 9, through the passages 16 of the sleeves 15 into the groove 26 and thence via the hole 28 and inner space 27 to the outlet opening 3 (FIG. 1) of the filter.

For washing the filter elements, a part of the filtrate flow is fed, by manipulating the tap 31 (FIG. 1), to the inner space 27 of the mandrel 8 of the other filter cartridge 7, concurrently with feeding to the outlet opening 3. This clean flow of filtrate, moving in the reversed order as compared to the above-described filtering flow, washes the filter elements of the cartridge 7.

Alternate switching of the filtrate flow by manipulating the taps 30 and 31 provides for washing of both cartridges 6 and 7 during continuous filtrate feeding to the outlet opening 3 of the filter. The flow used for washing the filter elements becomes contaminated as it passes along a reverse path to the normal filtration and is eliminated at a part 33.

Helical grooves 29 provided on the inner surface of the auxiliary sleeve 23 (FIG. 3) eliminate the formation of dead zones in the path of flow between the passages 24 and the filtering baffles 12 in the filtering mode, as well as in the recovery mode with reversed filtrate flow.

During assembly of the filter elements 9 on the mandrel 8 (FIG. 2) the threaded sleeve 22 enables elimination of loose contact of the seals 14 and the filtering baffles 12 along their periphery which would be otherwise inevitable due to manufacturing tolerances. In addition, the sleeve 22 prevents the formation of a gap between the filtering baffles 12 and the seal 14 located on the periphery of the baffle when melt or solution is fed under pressure to the inner space of the filter elements 9 during washing. The auxiliary sleeve 23, along with fixing of the filter elements 9, spacer sleeves 18 and spacer plates 20, 20a providing for reliable assembly and high quality of filter, prevents radial displacing of the seals 14 during washing of the filter elements 9, thus enabling the washing of the filtering baffles under high pressure. The latter facility provides for more complete recovery and prolongs the service life of the filter.

The filter constructed in accordance with the invention enables continuous filtering at high throughput capacity and at a high pressure difference (on the order of 400 kp/cm$^2$). The filter enables fine and superfine cleaning of highly viscous polymer melts and solutions (up to 500–50000 Pu).

With the filter featuring the washing of the filter elements directly in the filter during continuous operation of the filter, as well as comparatively simple accommodation of a large filtering surface (10 – 20 m$^2$) in one cartridge, continuous filtering of heavily contaminated and highly viscous liquids is ensured.

The construction of the device for tightening seals provides the conditions for reliable operation of the filter both during the removal of contaminants from the liquid and recovery of the filtering baffles at high pressure difference at the filtering baffles.

Compact arrangement of the filter elements and spacer plates with their reliable fixing in the cartridge in both axial and radial directions enables the provision of the compact filter having a large filtering surface within a small-volume chamber. Alongside with high strength parameters of the construction, streamlined configurations of the cartridge as a whole, and filter elements are provided, thus allowing the filtering of polymer melts and solutions without impairing quality of liquid due to destruction.

What is claimed is:

1. A filter for polymer melts and solutions comprising: a casing having an inlet opening and an outlet opening; a hollow mandrel mounted within said casing; filter elements supported in said casing by said hollow mandrel for flowing a melt or solution therethrough for filtering thereof; two filtering baffles in each of said filter elements; a spacer plate in each of said filter elements located between said two filtering baffles; each said filter elements having a sleeve having through radial passages for providing communication of the inner space of the corresponding filter element with the inner space of said mandrel, said sleeve being located on the periphery of said mandrel between said filtering baffles; each of said filter elements having a seal located between said two filtering baffles on the periphery of said spacer plate; each of said filter elements having auxiliary seals, each being located between said filter elements on the periphery of said hollow mandrel; a spacer device comprising auxiliary spacer plates, each spacer plate being located between said filter elements and corresponding to the surface of said filtering baffle; a device for recirculating filtered polymer melts or solutions alternately through said filter elements for washing the filter; clamping flanges mounted on said hollow mandrel for axially fixing said filter elements.

2. A filter according to claim 1, wherein said washing device comprises: at least two end spacer plates, each spacer plate being mounted between each of said clamping flanges and a corresponding filter element; a device for tightening said seals which are located between said filtering baffles on the periphery of said spacer plates, said device being axially movable to different set axial positions on one of said clamping flanges.

3. A filter according to claim 2, wherein said device for tightening said seals comprises a threaded sleeve.

4. A filter according to claim 2, including an auxiliary sleeve located on the periphery of said filter elements, said auxiliary spacer plates and said two end spacer plates, and mounted on said clamping flanges.

5. A filter according to claim 1, including an auxiliary sleeve located on the periphery of said filter elements, said auxiliary spacer plates and said two end spacer plates and mounted on said clamping flanges.

6. A filter according to claim 5, wherein said auxiliary sleeve is perforated and is internally provided with multiple helical grooves for eliminating dead zones and lowering hydraulic resistance.

* * * * *